United States Patent
Ogburn

(10) Patent No.: US 8,141,455 B2
(45) Date of Patent: Mar. 27, 2012

(54) GRAB BAR END CAP

(75) Inventor: Sean T. Ogburn, Hoschton, GA (US)

(73) Assignee: Rehrig Pacific Company, Los Angeles, CA (US)

( * ) Notice: Subject to any disclaimer, the term of this patent is extended or adjusted under 35 U.S.C. 154(b) by 538 days.

(21) Appl. No.: 12/129,866

(22) Filed: May 30, 2008

(65) Prior Publication Data

US 2009/0293667 A1    Dec. 3, 2009

(51) Int. Cl.
*B62K 21/12* (2006.01)
(52) U.S. Cl. .................................... 74/551.8
(58) Field of Classification Search .............. 74/543, 74/551.8, 551.9, 558.5; 280/33.992, 211, 280/242.1; 297/183.1; 248/145.6; 411/337, 411/948; 16/110.1, 111.1
See application file for complete search history.

(56) References Cited

U.S. PATENT DOCUMENTS

| | | | | |
|---|---|---|---|---|
| 298,649 A | * | 5/1884 | Yingling et al. ............. | 81/26 |
| 552,159 A | * | 12/1895 | Weaver, Jr. ................ | 74/551.9 |
| 2,803,849 A | * | 8/1957 | Peters ......................... | 16/421 |
| 3,115,720 A | * | 12/1963 | Lachance ................... | 40/308 |
| 3,164,402 A | * | 1/1965 | Jobe ........................... | 403/243 |
| 4,956,900 A | | 9/1990 | Mair | |
| 5,145,171 A | * | 9/1992 | Head et al. ................. | 473/300 |
| 5,706,559 A | | 1/1998 | Oliver et al. | |
| 6,435,790 B1 | | 8/2002 | Ichikawa | |
| 7,350,999 B2 | | 4/2008 | Brletich | |

* cited by examiner

*Primary Examiner* — Vicky Johnson
(74) *Attorney, Agent, or Firm* — Carlson, Gaskey & Olds

(57) ABSTRACT

A grab bar, which is particularly suitable for attachment to a cart, has open ends that are covered by end caps. The end caps include a retention feature that secures the end cap to the grab bar, and which prevents the grab bar from being detached from the cart. The end cap includes a plug portion that encloses the open end, with the plug portion defining an inner end face, an outer end face, and a peripheral wall surface extending between the inner and outer end faces. The end cap also includes an attachment arm that extends outwardly from the inner end face of the plug portion to a distal end. The retention feature is supported on a looped portion that is formed at the distal end of the attachment arm. The looped portion is resiliently movable to secure the end cap to the grab bar with the retention feature.

35 Claims, 5 Drawing Sheets

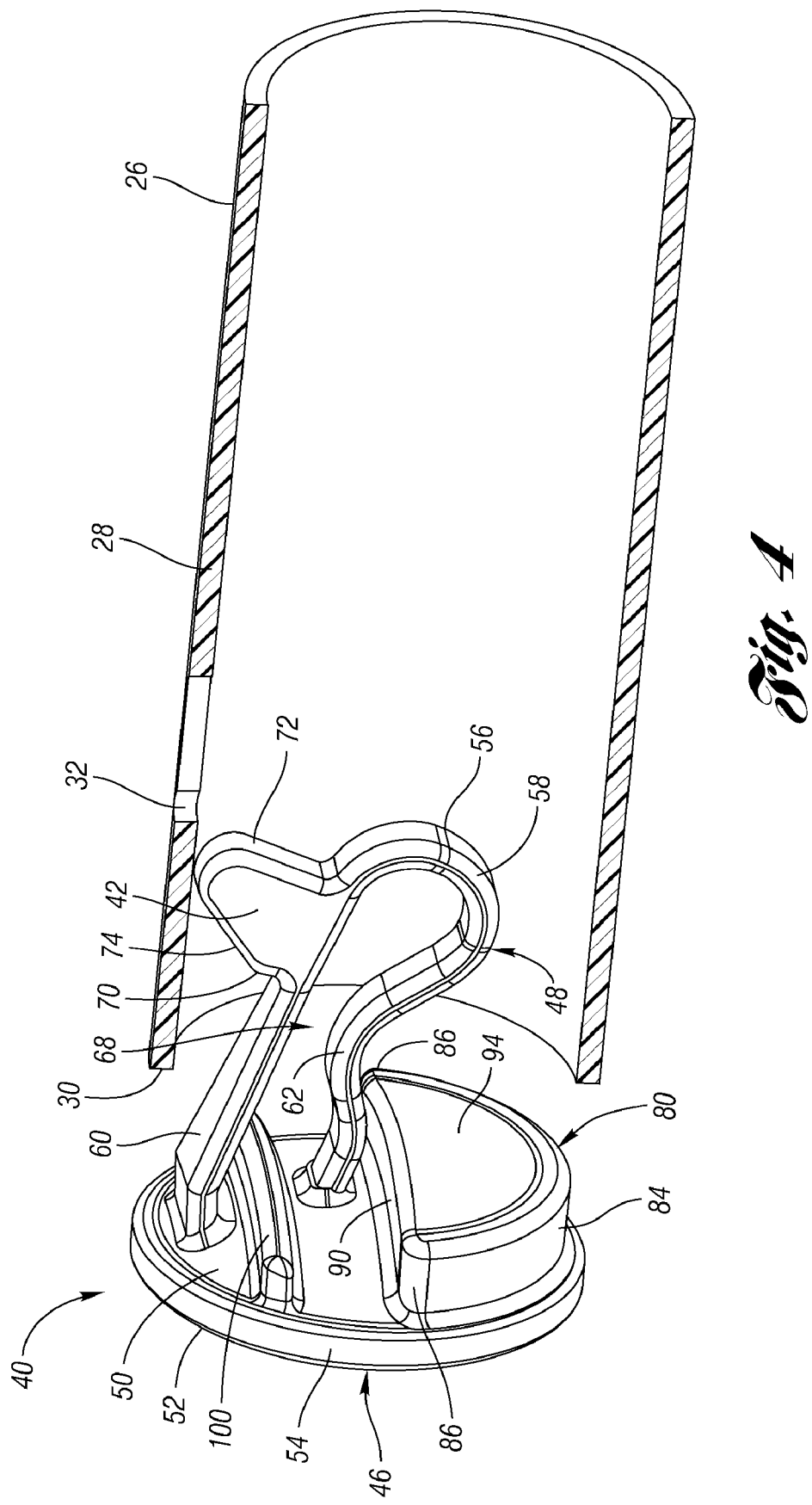

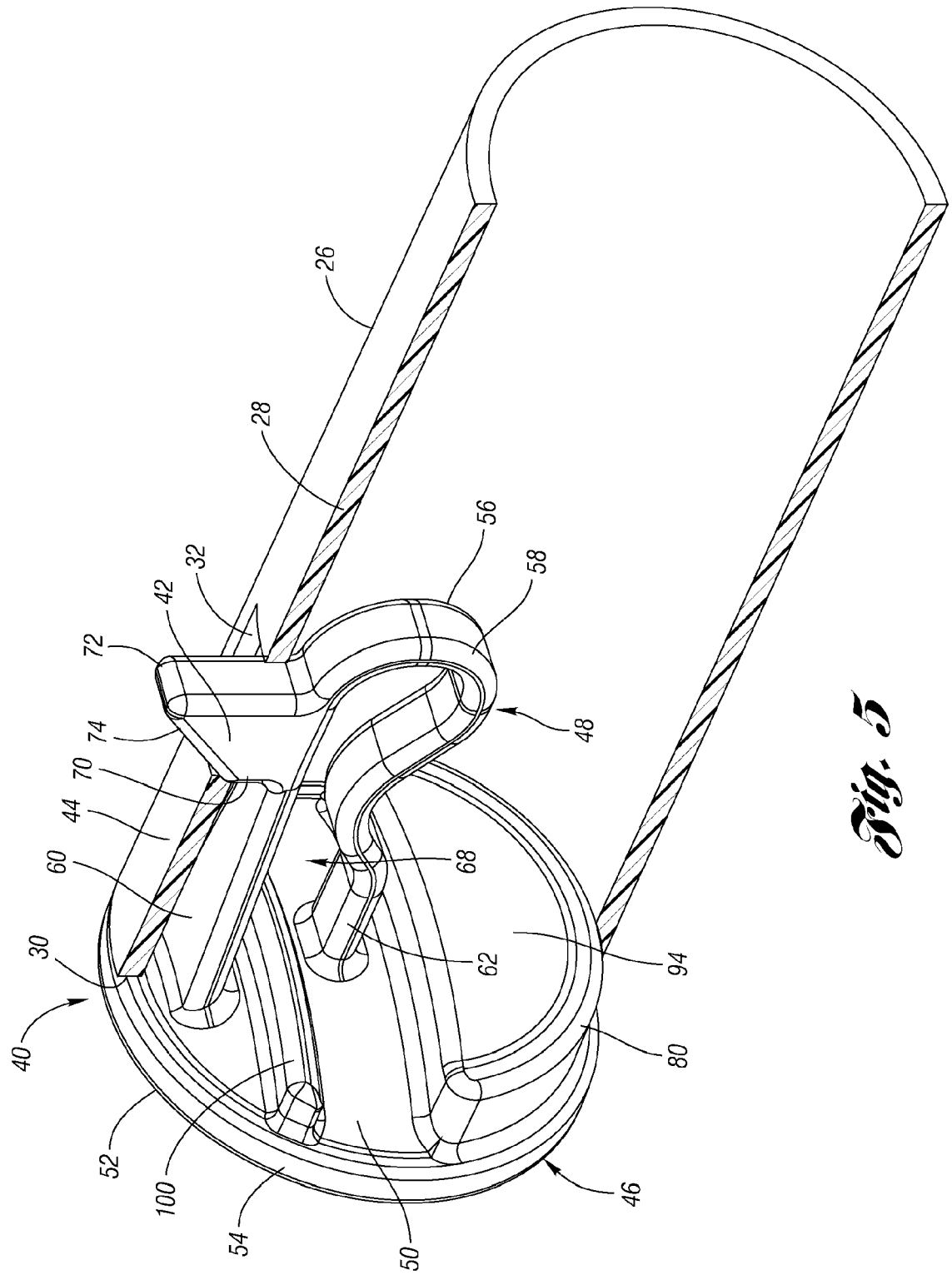

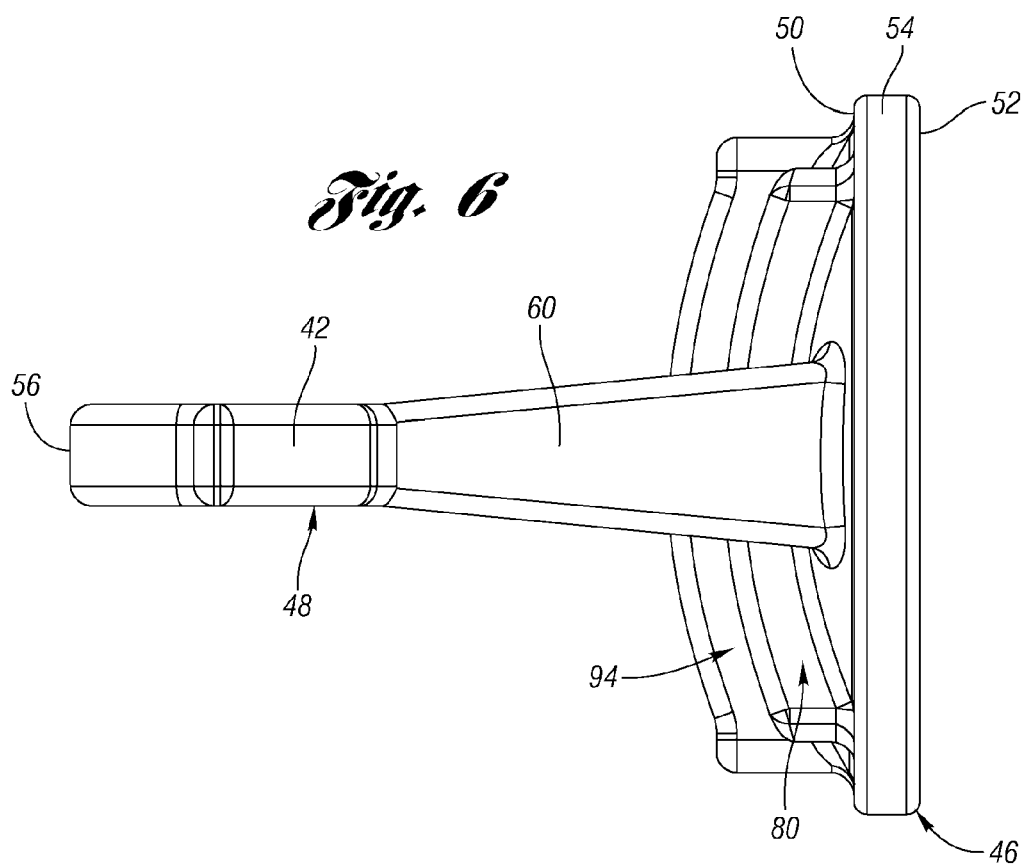
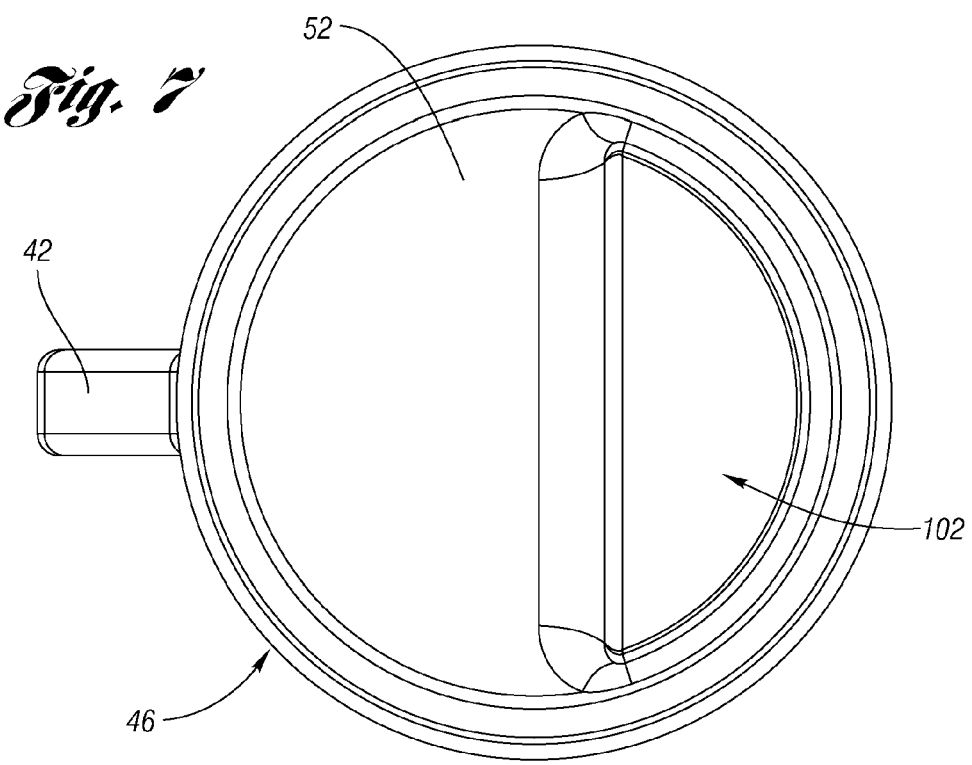

GRAB BAR END CAP

BACKGROUND OF THE INVENTION

Grab bars are attached to carts, such as trash carts for example, so that the cart can be lifted and emptied either manually or by use of a powered system. The grab bar has a tubular body that is positioned outside of the cart with open ends of the grab bar extending into an interior of the cart. The open ends are covered by end caps to prevent debris from entering the tubular body.

One known end cap includes a detent that is used to secure the end cap to the grab bar. The detent also prevents the grab bar from being detached from the trash cart. The end cap also includes a sealing portion that partially seals the open end of the grab bar. The sealing portion includes a slot or opening to allow fluid or debris to be drained out of the grab bar.

SUMMARY OF THE INVENTION

The present invention provides an improved end cap for a grab bar, which is particularly suitable for attachment to a cart, such as a trash cart for example.

The example end cap disclosed herein includes a retention feature that secures the end cap to the grab bar, and which prevents the grab bar from being detached from the cart.

In one example, the end cap includes a plug portion that encloses the open end and an attachment arm that supports the retention feature. The plug portion defines an inner end face, an outer end face, and a peripheral wall surface that extends between the inner and outer end faces. The attachment arm extends outwardly from the inner end face of the plug portion to a distal end. The retention feature is supported on a looped portion that is formed at the distal end of the attachment arm. The looped portion of the attachment arm is resiliently movable to secure the end cap to the grab bar with the retention feature.

In one example, the attachment arm includes first and second arm portions that are spaced apart from each other by a gap. The looped portion connects the first and second arm portions to each other.

In another feature of the example end cap, a strengthening rib extends outwardly from the inner end face at a position within the gap.

In another feature of the example end cap, a sealing portion extends outwardly from the inner end face to facilitate sealing of the open end of the grab bar.

These and other features of the present invention can be best understood from the following specification and drawings, the following of which is a brief description.

BRIEF DESCRIPTION OF THE DRAWINGS

FIG. 4 is a perspective view of the end cap in a partial insertion position within the grab bar.

FIG. 5 is a perspective view of the end cap in a fully installed position.

FIG. 6 is a top view of the end cap of FIG. 2.

FIG. 7 is an end view of the end cap of FIG. 2.

DETAILED DESCRIPTION OF THE PREFERRED EMBODIMENT

Figure 1:
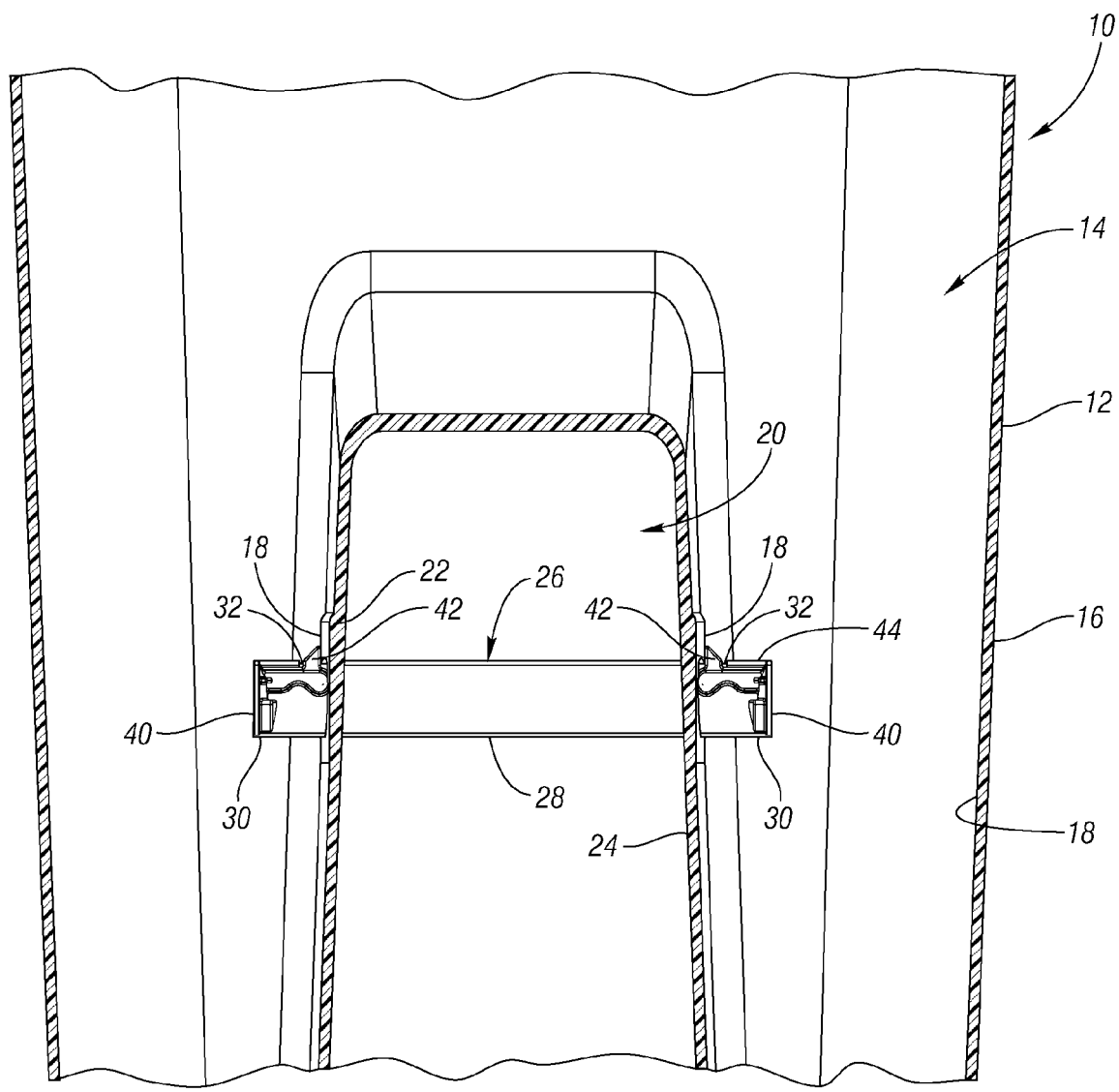
FIG. 1 is a partial cross-sectional view of a cart with an example grab bar and end cap assembly according to the present invention.

A cart 10, such as a trash cart for example, is shown in FIG. 1. The cart 10 includes a cart body 12 that defines an interior cavity 14. The cart body 12 has an exterior surface 16 and an interior surface 18 that defines the interior cavity 14. The interior cavity 14 is open at one end to receive trash or other objects, and can be covered by a lid (not shown). The cart 10 can also be supported on wheels (not shown) such that the cart 10 can be easily moved between various locations.

A recess 20 is formed within the exterior surface 16 of the cart body 12. The recess 20 is bounded in part by first 22 and second 24 opposing walls. A grab bar 26 extends across the recess 20. The grab bar 26 is thus easily accessible such that the cart 10 can be lifted and emptied as needed.

The grab bar 26 comprises a tubular body 28 that has open ends 30. The tubular body 28 extends across the recess 20 with one of the open ends 30 extending through the first opposing wall 22 and into the interior cavity 14, and with the other of the open ends 30 extending through the second opposing wall 24 and into the interior cavity 14. The tubular body 28 includes at least one aperture 32 near each of the open ends 30. When the grab bar 26 is installed within the cart body 12, the apertures 32 are located within the interior cavity 14.

End caps 40 are used to enclose the open ends 30. The end caps 40 each include a retention feature 42 that is received within the corresponding aperture 32 to secure the end cap 40 to the grab bar 26. The retention feature 42 also prevents the grab bar 26 from becoming detached from the cart body 12. The retention features 42 extend through the apertures 32 and outwardly beyond an outer surface 44 (FIG. 5) of the tubular body 28 such that the retention features 42 can abut against the interior surface 18 at the first 22 and second 24 opposing walls to prevent the grab bar 26 from sliding out of the cart body 12.

The end caps 40 are shown in greater detail in FIGS. 2-7. The end cap 40 includes a plug portion 46 and an attachment arm 48 that supports the retention feature 42. The plug portion 46 is used to seal the open ends 30 of the grab bar 26 and includes an inner end face 50, an outer end face 52, and a peripheral wall surface 54 extending between the inner 50 and outer 52 end faces.

The attachment arm 48 extends outwardly from the inner end face 50 of the plug portion 46 to a distal end 56. The attachment arm 48 includes a looped portion 58 that is formed at the distal end 56. The looped portion 58 supports the retention feature 42 at a position near the distal end 56 such that the outermost part of the looped portion 58 extends axially beyond the retention feature 42. The attachment arm 48 is cantilevered such that the distal end 56 is free to move in a resilient manner relative to the plug portion 46. As such, the looped portion 58 of the attachment arm 48 is resiliently movable to secure the end cap 40 to the grab bar 26 with the retention feature 42.

Figure 3:
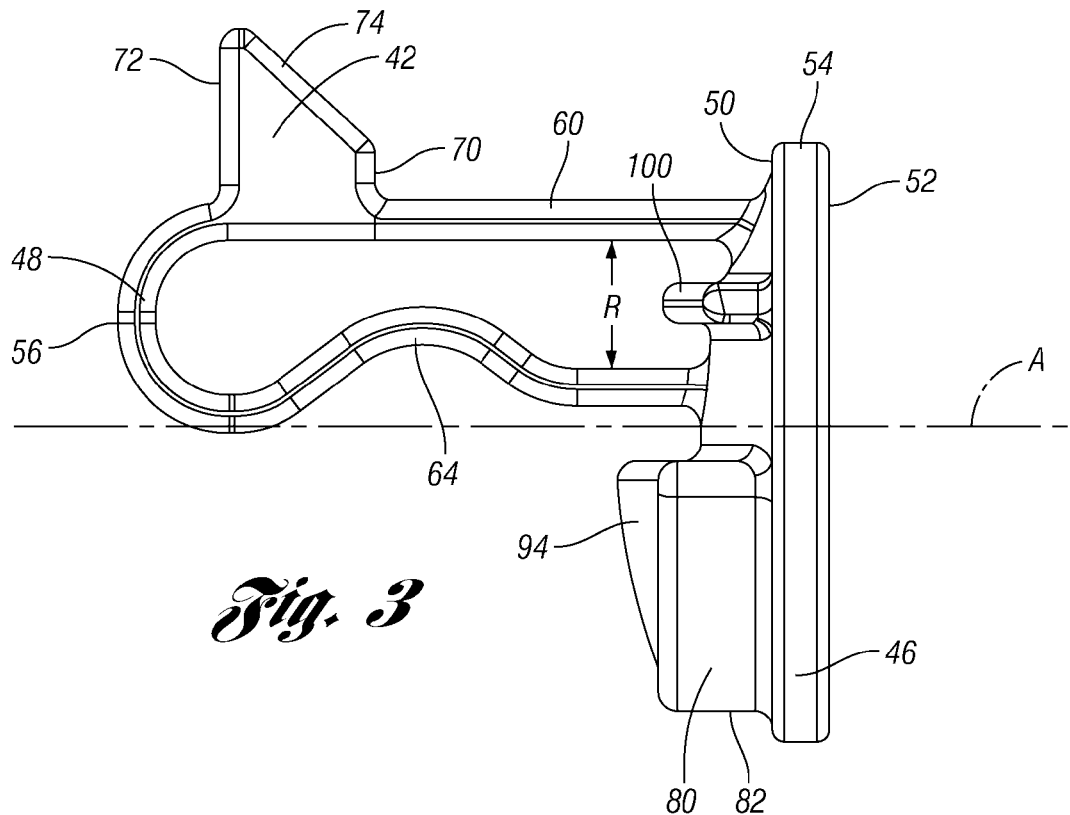
FIG. 3 is a side view of the end cap of FIG. 2.

As shown in FIG. 3, in an initial uninstalled position, the retention feature 42 extends outwardly beyond an outermost surface of the peripheral wall surface 54 of the plug portion 46. As the end cap 40 is initially inserted into the open end 30, as shown in FIG. 4, the retention feature 42 and looped portion 58 are resiliently movable in a radially inward direction toward a center of the tubular body 28 due to contact between the retention feature 42 against an inner surface of the tubular body 28. When the retention feature 42 reaches the aperture 32 in the tubular body 28, the looped portion 58 and retention feature 42 are resiliently snapped into place as they move in a radially outward direction (FIG. 5).

When the end cap 40 is in the fully installed position as shown in FIG. 5, the peripheral wall surface 54 fits against an inner surface of the tubular body 28 to seal the open ends 30. Further, the retention feature 42 is engagable with an edge of the aperture 32 formed within the tubular body 28 to prevent the end cap 40 from being removed from the grab bar 26.

Figure 2:
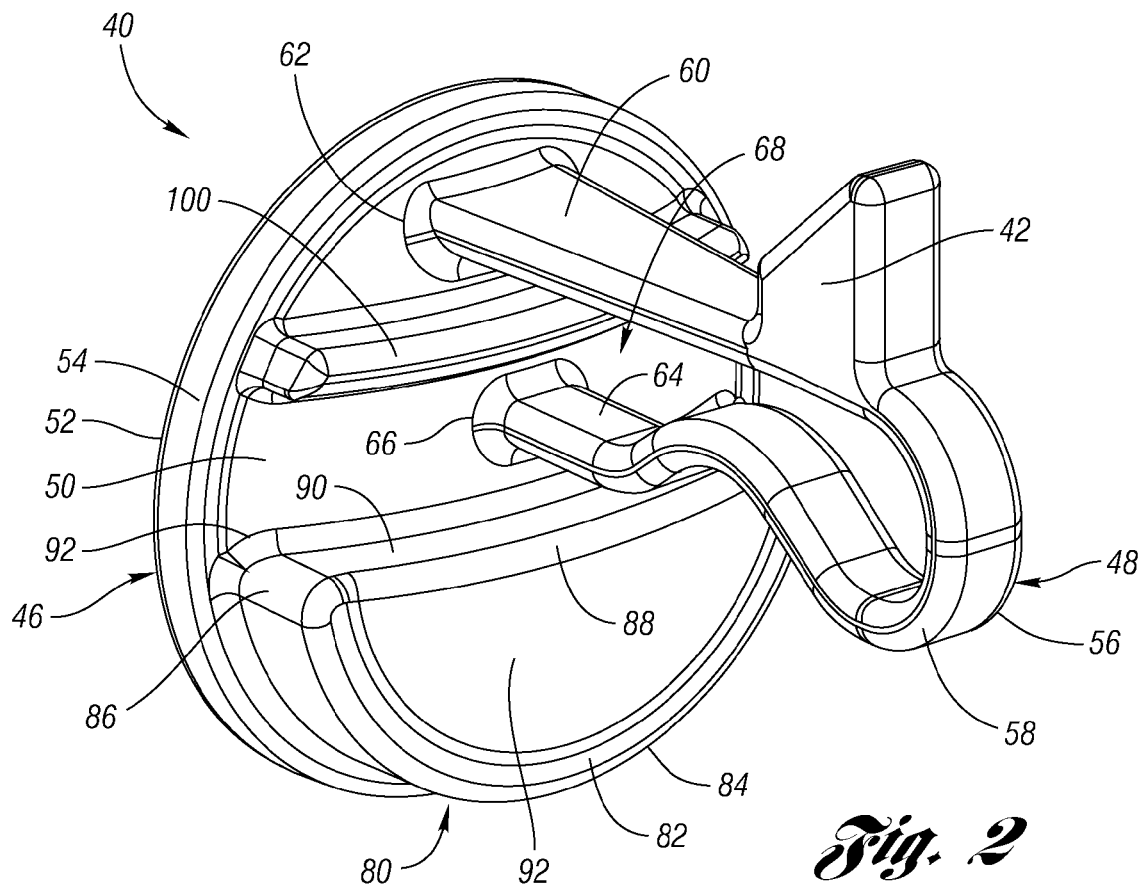
FIG. 2 is a perspective view of an end cap from FIG. 1.

As shown in FIGS. 2-3, the attachment arm 48 includes a first arm portion 60 attached to a first portion or first area 62 of the inner end face 50 and a second arm portion 64 attached to a second portion or second area 66 of the inner end face 50. The first 62 and second 66 areas are spaced apart from each other by a gap 68. The first area 62 is located near a periphery of the plug portion 46 and the second area 66 is located near a center of the plug portion 46. Thus, the attachment arm 48 is attached to, or supported by, the plug portion 46 at two discrete locations on the inner end face 50.

The looped portion 58 connects the first 60 and second 64 arm portions to each other. The configuration of the two separate arms connected by a looped portion provides sufficient resiliency for a snap-fit attachment, as well as providing a sufficiently robust connection interface to prevent the grab bar from detaching from the cart.

As best shown in FIG. 3, the retention feature 42 has a first end 70 facing the inner end face 50 of the plug portion 46 and a second end 72 facing opposite the first end 70. The retention feature 42 includes a sloped surface 74 that extends between the first 70 and second 72 ends such that the second end 72 of the retention feature 42 is further away from the looped portion 58 than the first end 70. Thus, the retention feature 42 is thicker at the second end 72 than the first end 70. In the example shown, the sloped surface 74 has a rectangular shape; however, other shapes could also be used. The sloped surface 74 facilitates a smooth insertion into the aperture 32.

The end cap 40 defines a center axis A with the first 60 and second 62 arm portions being spaced apart from each other by a radial distance R. As shown in FIG. 3, the radial distance R between the first 60 and second 62 arm portions varies in a direction that extends along the axis A. In the example shown, this variable radial distance R is provided by one of the first 60 and second 62 arms having a serpentine profile; however other profiles could also be used. Further, either or both of the arms could have a variable profile.

A sealing portion 80 extends outwardly from the inner end face 50 of the plug portion 46. The sealing portion 80 has a partial peripheral portion 82 that has an arcuate surface 84 that extends between opposing diametrical sides 86 (FIG. 4) of the sealing portion 80. The arcuate surface 84 of the partial peripheral portion 82 generally corresponds in profile to the peripheral wall surface 54 of the end cap 40. A remaining peripheral portion 88 of the sealing portion 80 is defined by a linear surface 90 that connects the opposing diametrical sides 86.

The sealing portion 80 is formed at a third portion or third area 92 of the inner end face 50 that is discretely located from attachment points of the attachment arm 48. As such, the third area 92 is separate from the first 62 and second 66 areas.

The sealing portion 80 also includes a portion 94 that has a spherical surface that curves inwardly toward the center of the end cap 40. As shown in FIG. 3, the portion 94 extends from the partial peripheral portion 82 toward the remaining peripheral portion 88. The portion 94 is formed such that the portion 94 is thicker near the center of the end cap 40 than at an edge of the end cap 40, see FIG. 6.

At least one strengthening rib 100 extends outwardly from the inner end face 50 of the plug portion 46. In the example shown, the strengthening rib 100 extends through the gap 68 between the first 60 and second 64 arm portions. In this example, the strengthening rib 100 is generally parallel to the linear surface 90 of the sealing portion 80. Additional strengthening ribs could also be used, or the strengthening rib(s) could be orientated in a different configuration than that which is shown in FIG. 2.

The sealing portion 80 provides a recessed area 102 in the outer end face 52, see FIG. 7. The recessed area 102 facilitates insertion and removal of the end caps 40 from the grab bar 26.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An end cap for a grab bar comprising:
   a plug portion to enclose an open end of a grab bar, the plug portion defining an inner end face, an outer end face, and a peripheral wall surface extending between the inner and outer end faces; and
   an attachment arm extending outwardly from the inner end face of the plug portion to a distal end, the attachment arm including a retention feature supported on a looped portion formed at the distal end wherein the looped portion of the attachment arm is resiliently movable to secure the end cap to the grab bar with the retention feature.

2. The end cap of claim 1 wherein the looped portion is movable in a radially inward direction during insertion of the looped portion in the open end of the grab bar and is movable in a radially outward direction when the retention feature reaches an opening formed in a wall of the grab bar.

3. The end cap of claim 2 wherein the retention feature is to engage an edge of the opening formed within the wall of the grab bar to prevent the end cap from being removed from the grab bar.

4. The end cap of claim 1 wherein the attachment arm includes a first arm portion attached to a first area of the inner end face and a second arm portion attached to a second area of the inner end face spaced apart from the first area, and wherein the first and second arm portions are spaced apart from each other by an open gap with the looped portion connecting distal ends of the first and second arm portions to each other.

5. The end cap of claim 4 wherein the retention feature has a first end facing the inner end face of the plug portion and a second end facing opposite the first end, and wherein a sloped surface extends between the first and second ends such that the second end of the retention feature is further away from the looped portion than the first end.

6. The end cap of claim 4 wherein the first and second arm portions are spaced apart from each other by a radial distance and wherein the radial distance between the first and second arm portions varies in a direction that extends from the inner end face toward the distal end of the attachment arm.

7. The end cap of claim 4 wherein the plug portion defines a center and wherein one of the first area and the second area of the inner end face is adjacent the center and the other of the first area and the second area is adjacent to a periphery of the plug portion.

8. The end cap of claim 1 including a sealing portion extending outwardly from the inner end face of the plug portion, the sealing portion having a partial peripheral portion having an arcuate surface that extends between opposing diametrical sides of the sealing portion, and the sealing portion having a remaining peripheral portion defined by a linear surface that connects the opposing diametrical sides.

9. The end cap of claim 8 wherein the attachment arm includes a first arm portion attached to a first area of the inner end face and a second arm portion attached to a second area of the inner end face spaced apart from the first area, and wherein the looped portion connects the first and second arm portions to each other, and wherein the sealing portion is formed at a third area of the inner end face that is separate from the first and second areas.

10. The end cap of claim 9 including at least one strengthening rib extending outwardly from the inner end face, the strengthening rib extending between the first and second arm portions.

11. The end cap of claim 10 wherein the strengthening rib is generally parallel to the linear surface of the sealing portion.

12. The end cap of claim 1 wherein the retention feature is selectively moveable in a radially inward direction such that the end cap can be detached from the grab bar.

13. The end cap of claim 12 wherein the outer end face includes a recessed area that provides a gripping surface to facilitate insertion and removal of the end cap from the grab bar.

14. The end cap of claim 1 wherein the plug portion and attachment arm are integrally formed together as a single-piece component.

15. The end cap of claim 1 including a sealing portion that extends outwardly from the inner end face, the sealing portion being received inside of the open end of the grab bar.

16. The end cap of claim 1 wherein said retention feature has a distal end that extends radially outwardly of an outer surface of the grab bar when the end cap is secured to the grab bar.

17. The end cap of claim 1 wherein the retention feature extends radially outwardly beyond an outermost surface of the peripheral wall surface of the plug portion when the end cap is secured to the grab bar.

18. The end cap of claim 1 wherein the peripheral wall surface comprises a sealing surface to abut against an inner surface of the grab bar to seal the open end.

19. The end cap of claim 18 including a sealing portion extending outwardly from the inner end face to a distance that axially beyond said peripheral wall surface.

20. An end cap and grab bar assembly for a cart comprising:
a grab bar having a tubular wall structure extending between open ends, the tubular wall structure including at least one aperture; and
at least one end cap including a plug portion to enclose one of the open ends, the plug portion defining an inner end face, an outer end face, and a peripheral wall surface extending between the inner and outer end faces, and the end cap including an attachment arm extending outwardly from the inner end face of the plug portion to a distal end, the attachment arm including a retention feature supported on a looped portion formed at the distal end wherein the looped portion of the attachment arm is resiliently movable to fit the retention feature in the aperture of the grab bar to secure the end cap to the grab bar.

21. The end cap and grab bar assembly of claim 20 wherein the grab bar is mountable to a cart defining an interior cavity wherein the open ends of the grab bar are insertable into the interior cavity with the end cap being inserted into the one of the open ends, and wherein the retention feature secures the end cap to the grab bar and prevents the grab bar from being detached from the cart.

22. The end cap and grab bar assembly of claim 20 wherein the attachment arm includes a first arm portion attached to a first area of the inner end face and a second arm portion attached to a second area of the inner end face spaced apart from the first area such that the first and second arm portions are separated by a gap, and wherein the looped portion connects the first and second arm portions to each other.

23. The end cap and grab bar assembly of claim 22 wherein at least one of the first and second arm portions has a serpentine profile.

24. The end cap and grab bar assembly of claim 22 wherein the end cap includes a sealing portion extending outwardly from the inner end face of the plug portion, the sealing portion having a partial peripheral portion with an arcuate surface that extends between opposing diametrical sides of the sealing portion, and the sealing portion having a remaining peripheral portion defined by a linear surface that connects the opposing diametrical sides.

25. The end cap and grab bar assembly of claim 24 wherein the arcuate surface of the partial peripheral portion of the sealing portion generally corresponds in profile to the peripheral wall surface of the end cap.

26. The end cap and grab bar assembly of claim 22 including at least one strengthening rib extending outwardly from the inner end face, the strengthening rib extending between the first and second arm portions.

27. The end cap and grab bar assembly of claim 26 wherein the strengthening rib is generally parallel to a linear surface of a sealing portion that extends outwardly from the inner end face of the plug portion.

28. The end cap and grab bar assembly of claim 22 wherein the retention feature has a first end facing the inner end face of the plug portion and a second end facing opposite the first end, and wherein the retention feature has a sloped surface that extends from the first end to the second end such that the second end of the retention feature has a greater thickness than the first end.

29. The end cap and grab bar assembly of claim 28 wherein the second end of the retention feature resiliently snaps into the aperture in the grab bar and extends outwardly beyond an outer surface of the tubular wall structure to secure the end cap to the grab bar.

30. The end cap and grab bar assembly of claim 20 wherein the retention feature is selectively moveable in a radially inward direction such that the end cap can be detached from the grab bar.

31. The end cap and grab bar assembly of claim 30 wherein the outer end face includes a recessed area that provides a gripping surface to facilitate insertion and removal of the end cap from the grab bar.

32. The end cap and grab bar assembly of claim 20 wherein the peripheral wall surface comprises a sealing surface that abuts against an inner surface of the tubular wall structure to seal the open end, and including a sealing portion that extends outwardly from the inner end face, the sealing portion extending into the tubular wall structure axially beyond the peripheral wall surface.

33. The end cap and grab bar assembly of claim 20 wherein the retention feature extends radially outwardly beyond an outer surface of the tubular wall structure when the end cap is secured to the grab bar, and wherein the retention feature includes an abutment surface to engage an interior surface of the cart to prevent the grab bar from being detached from the cart.

34. An end cap and grab bar assembly for a cart comprising:
a grab bar adapted to be secured to a body, the grab bar having a tubular wall structure extending between open ends, the tubular wall structure including at least one aperture;
at least one end cap including a plug portion to enclose one of the open ends, the plug portion defining an inner end face, an outer end face, and a peripheral wall surface extending between the inner and outer end faces to define a sealing surface that engages an inner surface of the tubular wall structure;

wherein the end cap includes an attachment arm extending outwardly from the inner end face of the plug portion to a looped distal end, the attachment arm including a retention feature formed at the distal end wherein the attachment arm is resiliently movable to fit the retention feature in the aperture of the grab bar to secure the end cap to the grab bar, and wherein the attachment arm is resiliently moveable to release the retention feature from the aperture to detach the end cap from the grab bar; and wherein the retention feature includes an abutment surface that engages the body to prevent detachment of the grab bar from the body.

35. The end cap and grab bar assembly of claim 34 wherein the attachment arm comprises first and second arm portions spaced apart from each other by an open gap and connected to each other at distal arm ends by a single looped portion, and wherein the retention feature extends outwardly from one of the first and second arm portions.

* * * * *